(12) United States Patent
Wloka et al.

(10) Patent No.: US 6,765,584 B1
(45) Date of Patent: Jul. 20, 2004

(54) SYSTEM AND METHOD FOR CREATING A VECTOR MAP IN A HARDWARE GRAPHICS PIPELINE

(75) Inventors: Matthias M. Wloka, Sunnyvale, CA (US); Gregory E. James, Redwood City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 168 days.

(21) Appl. No.: 10/099,770

(22) Filed: Mar. 14, 2002

(51) Int. Cl.[7] ............................................. G09G 5/00
(52) U.S. Cl. .................... 345/584; 345/582; 345/583; 345/585; 345/586; 345/587; 345/420; 345/426
(58) Field of Search ............................... 345/582, 584, 345/420, 426, 583, 585, 586, 587, 505, 506, 502, 427, 552

(56) References Cited

U.S. PATENT DOCUMENTS

| | | | | |
|---|---|---|---|---|
| 6,288,721 B1 | * | 9/2001 | Donoghue et al. | 345/426 |
| 6,384,824 B1 | * | 5/2002 | Morgan et al. | 345/426 |
| 6,518,968 B1 | * | 2/2003 | Ritter et al. | 345/426 |
| 6,614,431 B1 | * | 9/2003 | Collodi | 345/426 |
| 2002/0101419 A1 | * | 8/2002 | Cook | 345/426 |
| 2003/0001851 A1 | * | 1/2003 | Bushey | 345/506 |

OTHER PUBLICATIONS

DeLoura, Mark A. "Gaming Programming Gems", Charles River Media, Inc. Rockland, Massachusetts, 2000.
Ebert, David S. "Texturing and Modeling Second Edition" AP Professional is a division of Academic Press.
Gardner, Martin "Mathematical Games".
http://developer.nvidia.com/view.asp?IO=Filter_Blitting; "Filter Blitting", last updated May 10, 2001.
Kilgard, Mark J. "NVIDIA OpenGL Extension Specifications".
Feynman, Richard P. "QED The Strange Theory of Light and Matter", Princeton University Press, Princeton, New Jersey.
Möller, Tomas et al. "Real–Time Rendering" AK Peters, Natick, Massachusetts.
Neider, Jackie et al. "OpenGL Programming Guide: The Official Guide to Learning OpenGL, Release 1" Addison–Wesley Publishing Company.
Stam, Jos, "Diffraction Shaders" Siggraph, Los Angeles, California 1999.
Witting, Patrick, "Computational Fluid Dynamics in a Traditional Animation Environment" Siggraph, Los Angeles, California 1999.

* cited by examiner

*Primary Examiner*—Kee M. Tung
*Assistant Examiner*—Mike Rahmjoo
(74) *Attorney, Agent, or Firm*—Silicon Valley IP Group, PC; Kevin J. Zilka

(57) ABSTRACT

A system and method are provided for creating a vector map in a hardware graphic pipeline. Initially, one of a plurality of transforms is selected in a hardware graphic pipeline. Further, input is processed in order to generate a vector map utilizing the selected transform in the hardware graphics pipeline. Subsequently, a plurality of pixel color values is rendered utilizing the vector map.

42 Claims, 12 Drawing Sheets

Simple 4-Neighbor Sampling:
dz/du = ( t0.z - t1.z ) / 2        // U gradient
dz/dv = ( t3.z - t2.z ) / 2        // V gradient
Normal = Normalize( (dz/du) CROSS (dz/dv) )

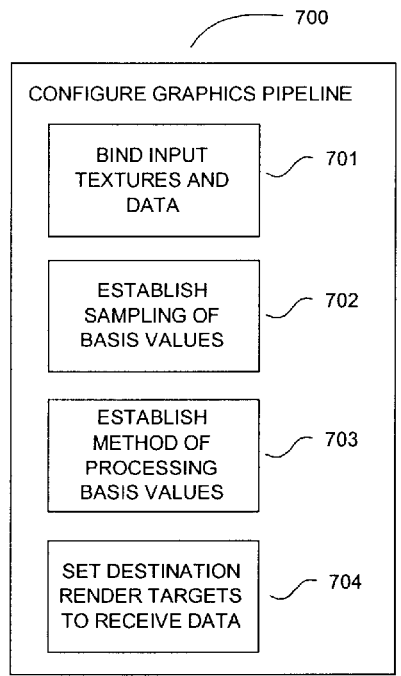
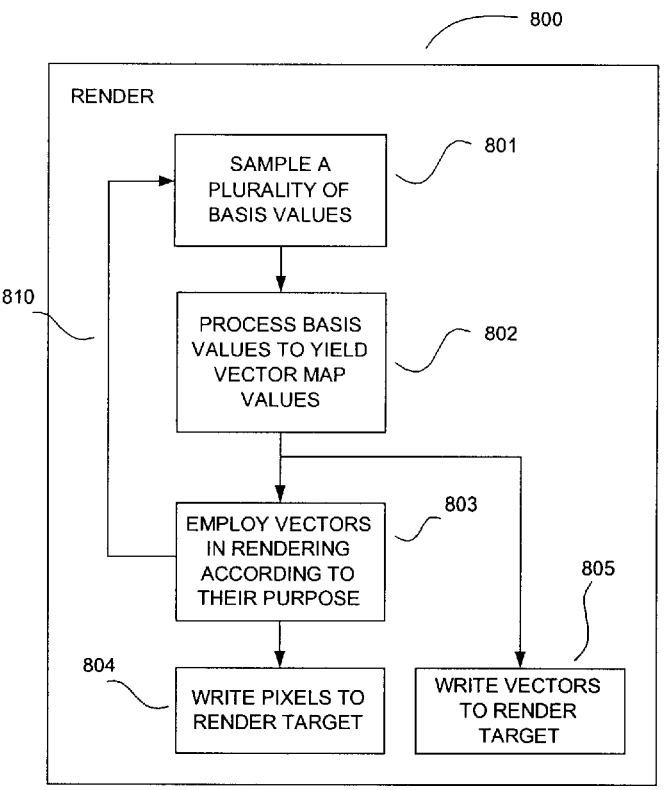
FIGURE 7
FIGURE 8
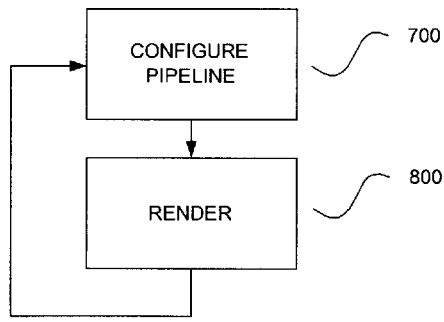
FIGURE 9

SYSTEM AND METHOD FOR CREATING A VECTOR MAP IN A HARDWARE GRAPHICS PIPELINE

FIELD OF THE INVENTION

The present invention relates to computer graphics, and more particularly, to creating vector maps in a computer graphics processing pipeline.

BACKGROUND OF THE INVENTION

In a computer graphics pipeline, three-dimensional objects are typically rendered by assembling a plurality of polygons in a desired shape. The polygons are conventionally triangles 100 (See Prior Art FIG. 1) composed of vertices which are defined by spatial coordinates, color values, and texture coordinates among other values. As this polygonal representation consists of a collection of flat facets of fixed size, a texture map 102 (See Prior Art FIG. 1) is often applied to the facets in order to provide greater detail. This texture map describes a pattern to be applied to the surface of each triangle to vary the color or other properties. The texture map itself is a matrix of values typically interpreted as color components, and the placement of values in the matrix describes a pattern which, when applied to the triangles, may vary the colors in accordance with the pattern. The texture map elements are accessed by a texture coordinate, and the values stored at each integral texture coordinate constitute one texel (texture element) within the texture map. The texture map is typically loaded as a file from disk or created and filled with values by the computer system central processor.

Texture maps may also be interpreted and used as vector maps, whereby the texture map values do not represent the colors of a pattern, but instead represent multi-dimensional vectors within a pattern. For example, rather than storing the surface color at each texel of a texture map, one could provide a texture map which holds a surface normal vector at each texel. This map then represents a geometric surface at a level of detail independent of the polygonal vertex geometry. A texture map of this type, referred to as a normal map 104 (See Prior Art FIG. 1), may then be used in lighting and shading calculations in the graphics pipeline, and the normal map provides a more efficient representation of surface detail than the polygonal vertex geometry.

In general, normal maps 104 (See Prior Art FIG. 1) are one formulation of vector maps. Other typical vector map formulations include displacement maps for environment-mapped bump mapping (EMBM), displacement maps for other texture perturbation techniques, and height maps 103 (See Prior Art FIG. 1). Displacement maps hold a vector used to perturb texture coordinates during rasterization, and height maps consist of a one-dimensional vector which represents the geometric height of a surface at each texel. The one possible differentiating feature of a vector map is that its values are not necessarily intended to be directly visible in pixels of the rendered scene. Rather than containing colors which are blended into pixels of the scene, vector maps contain values that are input to various graphics pipeline calculations. These calculations use the values to control aspects of rendering such as texture coordinate values, texture reads, surface lighting, and bump mapping. An example of this may be found with reference to: Moller, Tomas, and Haines, Eric, *Real-Time Rendering,* A K Peters, Ltd., 1999, p 136; which is incorporated herein by reference.

FIG. 1 thus illustrates typical data used in computer graphics rendering. Geometry (i.e. triangles 100) may be combined with a plurality of color textures of a texture map 102 and vector maps to produce a rendered image. Color textures represent the physical appearance of the object as seen by the human eye, while vector maps do not necessarily have perceptual counterparts in the physical world. Instead, vector maps contain mathematical or geometric information about the surface. Such information may include the height of the surface of the object at each texel as in a height map 103 and the normal vector to the surface at each texel as in a normal map 104, displayed here through the use of a color map to make the data perceptible.

Vector maps are utilized in a graphics hardware pipeline as input data to a variety of rendering calculations. One such operation may be that of per-pixel lighting as illustrated in Prior Art FIG. 2, whereby illumination values 204 are computed at each pixel of the rendered object 205. This calculation involves, for each pixel rendered, a dot-product 201 between incident light vectors 200 and the surface normal vectors 202. The vector map, in this case a surface vector normal map, is useful only in the context of the rendering calculation. The vector map values do not necessarily appear in the output, though they determine, via calculation, the appearance of the output.

Vector map values may be stored in a variety of numerical formats including, among other formats, unsigned integers, signed integers stored in a biased and scaled range, signed integers stored in twos-complement format, integers of various bit precision including 8, 16, and 32 bits, and floating point formats.

Vector map values are typically, but not necessarily, derived from geometric values. A vector map may be calculated from the gradient of a scalar map, as in the case of calculating a surface normal map from a height field, or it may be calculated as a collection of difference vectors between two or more collections of vectors. As vector maps may thus encode geometric features of a surface or affect rendering in ways more sophisticated than those of the standard diffuse texture mapping, it is desirable to animate their values when used in rendering. In this way, animation of the vector map data is analogous to animation of the values, such as surface height, from which the vector map is derived. Unfortunately, animation of the vector map in a meaningful fashion without the underlying data from which it is derived is not practical and in some cases is not possible. To animate the vector map, the practical solution is to animate the data from which it is derived and recalculate the vector map from the data.

Such calculations to create a vector map are involved, and in the prior art were performed by a software program executing on the computer system central processor. Prior Art FIG. 3 illustrates a prior solution to the problem of creating a vector map 306 from a height map 302. To create a normal map texel value 304 corresponding to each height map texel 300, an area of neighbors t0, t1, t2, and t3 surrounding the height map texel 300 are sampled and their values differenced. The differences produce two slope vectors dZ/dU and dZ/dV, the cross product of which is the three-dimensional surface normal vector. This vector may be stored as one texel of a texture map and the texture map transferred to the graphics pipeline. This method of creating the vector map may be performed on the CPU according to the prior art method of FIG. 3A.

Under this scheme as shown in FIG. 3A, the resulting vector map 306 must be transferred via a bus to the hardware graphics pipeline 312 for use in hardware-accelerated rendering. The high CPU cost of the calculations and bandwidth required to transfer the vector map to the graphics hardware severely restrict the use of this prior method with animated vector maps. Also, under the prior method, both the CPU and hardware graphics pipeline are prone to fall into an idle state at various times while waiting for the other to complete its operations. These idle states reduce the performance of the overall system. Under the prior method, the vector map and source data from which it is derived cannot be updated rapidly or efficiently for use in hardware accelerated rendering.

What is needed is a system in which vector map data may be calculated as needed in the graphics pipeline itself, independent of the CPU and without having to travel across the system bus from the CPU to the graphics pipeline. Vector map data generated in this way is available for immediate use in the hardware graphics pipeline. Such a system eliminates an interdependence between the CPU and graphics pipeline, allowing both to operate efficiently which in turn allows for rapid generation, animation, and use of vector map data in computer graphics rendering. Given the ability to create vector maps in a hardware graphics pipeline, the maps may then be used to modify themselves or their source data in further hardware graphics pipeline operations.

SUMMARY OF THE INVENTION

A system and method are provided for creating a vector map in a hardware graphics pipeline. Initially, one of a plurality of transforms is selected in a hardware graphics pipeline. Further, input is processed in order to generate a vector map utilizing the selected transform in the hardware graphics pipeline. Subsequently, a plurality of pixel color values is rendered utilizing the vector map.

In one embodiment, the input may include a height map. Further, the height map may be generated by the hardware graphics pipeline. As an option, the height map may be stored in the hardware graphics pipeline and may be updated by a central processing unit. In such case, the height map may be capable of being updated while saving bandwidth between the central processing unit and the hardware graphics pipeline.

In another embodiment, the input (i.e. height map) may be generated based on geometry information. Further, the input may be processed utilizing a rendering process of the hardware graphics pipeline. As an option, the vector map may be directly generated by processing input in the form of geometry information. Again, this may be carried out in the hardware graphics pipeline. In still another embodiment, the input may include basis values. Of course, the input may include any other input capable of being used to generate a vector map.

In still another embodiment, the vector map may include a bump map, a normal map, an environment-mapped bump mapping displacement map, and/or a displacement map. Optionally, the displacement map may include both positive and negative displacements. Further, the vector map may include a biased and scaled displacement map.

In the case where the input includes a height map, the height map may include a plurality of height map values that are each received in the form of a texel. In use, the processing may include sampling a plurality of neighboring texels surrounding a texel corresponding with each height map value in order to generate vectors. The sampling may include calculating a plurality of offset values associated with each height map value of the height map. Such offset values may each be associated with one of the neighboring texels. Further, the offset values may each be calculated by adding a vector value and a centering value. Still yet, the sampling may further include generating a plurality of vectors based on the offset values.

As an option, the aforementioned generated vectors may include gradient values. Moreover, the processing may include generating vector map values associated with the height map values based on the vectors. The processing may also include normalizing the vectors, and/or any desired filtering.

In still yet another embodiment, the processing of the vector map may occur in multiple passes. This repetition may be facilitated by way of a feedback loop. Such feedback loop may be biased by a gravity or other influence vector or a plurality of vector maps. Further, the processing may be repeated in a programmable manner. As an option, a vector map may be used to modify the height map of a subsequent pass. As an option, the vector map may be filtered before using the vector map to modify the height map. The foregoing operation may even be replicated, and the processing may be based on additional input.

In still another embodiment, the processing further includes writing the vector map values to a texture map. As an option, the rendering may occur immediately following the processing.

Optionally, the hardware graphics pipeline may include programmable pixel shader hardware. Further, the hardware graphics pipeline may include programmable vertex processing hardware. One example of an application of the foregoing technique involves the use of the vector map for per-pixel fluid rendering.

In another example of use, a first height map may be generated in a hardware graphics pipeline. Next, the first height map may be fed back in the hardware graphics pipeline. Thus, a second height map may be generated in the hardware graphics pipeline utilizing the first height map.

Thus, rather than relying on a central processing unit (CPU) to calculate a vector map from a height map or other data, the foregoing technique is designed for configuring the rendering operations of a hardware graphics pipeline such that the act of rendering calculates the vector map.

The input data from which the vector map is calculated may be stored in one or more textures in video memory. These textures may be sampled and combined in optionally programmable vertex processing and pixel processing hardware. The resulting output of the calculations may be rendered to a video memory surface (i.e. a texture) for later use as an input texture for lighting, reflection or any other type of 3-D rendering.

Thus, the present embodiments provide a technique for configuring a hardware graphics pipeline such that the operations of rendering calculate the desired vector map data from a variety of source data input to the graphics hardware. The source data includes one or more texture maps applied to polygonal geometric primitives. In the process of rendering, the pipeline configuration first creates and samples sufficient information to calculate the desired vector data. As rendering progresses, the vector data is then available for use in further calculations. It may be used, discarded, and/or written to graphics pipeline memory for later use, typically in the form of a vector map texture. This method creates vector map data on demand as needed by the hardware graphics pipeline. Given the ability to queue a host of rendering operations for efficient pipelined execution, this method allows the hardware graphics pipeline to create and utilize vector map data independent of the computer system central processor (CPU).

Vector map data created in this manner may be fed back into further rendering operations that in turn calculate additional vector map data. The method of this invention enables cascades and loops of the data through multiple rendering operations such that vector maps in the graphics hardware may perturb and modify themselves over time and in so doing, give rise to useful animations. In addition, the input data or rendering loops may be modified or perturbed by the host program executing on the CPU, and the configuration of the graphics pipeline calculates vector map values as required.

This method has the additional benefit of abstracting the expression of vector map calculations from the details of the actual underlying calculations being performed by the graphics pipeline. This is to say the graphics pipeline is configured and instructed to perform certain rendering operations that are guaranteed to yield appropriate vector map values. The details of how the graphics pipeline chooses to perform these calculations at each element, the degree of parallelism of the calculations, the time at which each element is processed, the order in which each element is processed, and the method of storage of the input and output data may vary per the desires of the user.

BRIEF DESCRIPTION OF THE DRAWINGS

The foregoing and other aspects and advantages are better understood from the following detailed description of a preferred embodiment of the invention with reference to the drawings, in which:

FIG. 7 illustrates the steps of configuring a hardware graphics pipeline in accordance with one embodiment.

FIG. 8 illustrates the process of rendering according to the configuration established.

FIG. 9 illustrates a fundamental rendering loop comprised of specifying a configuration and rendering.

DETAILED DESCRIPTION

Figure 1:
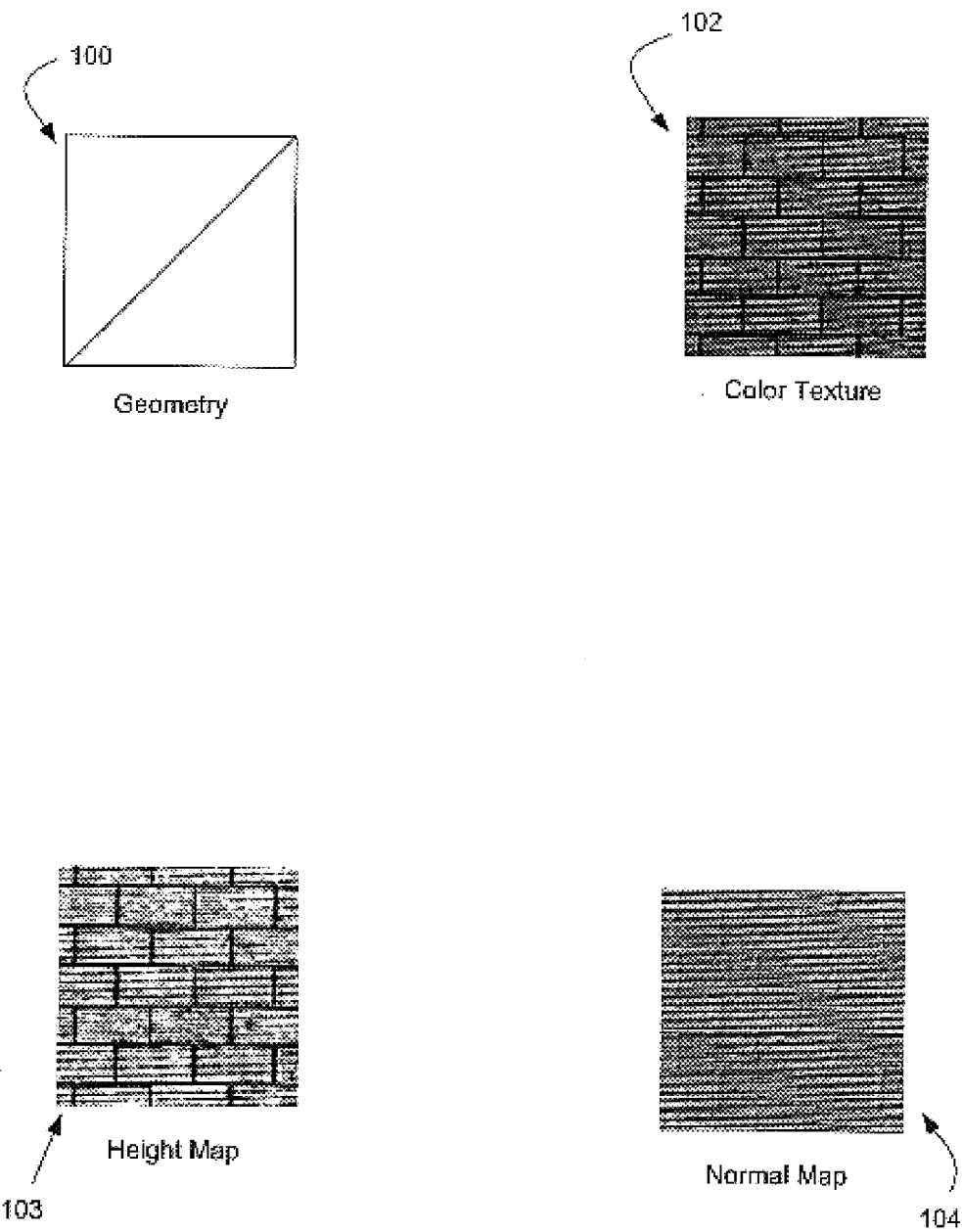
FIGS. 1–3A illustrate the prior art.
Figure 2:
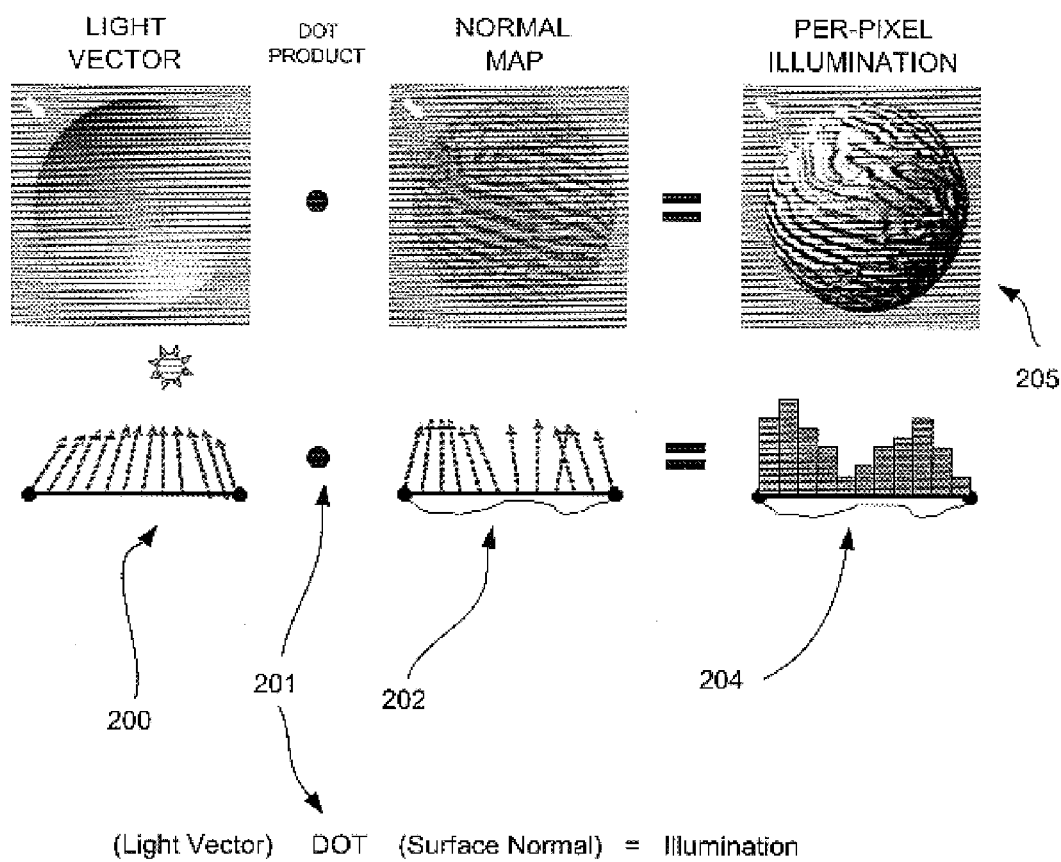

FIGS. 1–3A illustrate the prior art. FIG. 4 is a block diagram of a digital processing system embodying the method and apparatus in accordance with one embodiment. With reference to FIG. 4, a computer graphics system is provided that may be implemented using a computer 400. The computer 400 includes one or more processors, such as processor 401, which is connected to a communication bus 402. The computer 400 also includes a main memory 404. Control logic (software) and data are stored in the main memory 404 which may take the form of random access memory (RAM). The computer also includes a hardware graphics pipeline 406 and a display 408, i.e. a computer monitor.

The computer 400 may also include a secondary storage 410. The secondary storage 410 includes, for example, a hard disk drive and/or a removable storage drive, representing a floppy disk drive, a magnetic tape drive, a compact disk drive, etc. Computer programs, or computer control logic algorithms, are stored in the main memory 404 and/or the secondary storage 410. Such computer programs, when executed, enable the computer 400 to perform various functions. Memory 404 and storage 410 are thus examples of computer-readable media.

In one embodiment, the techniques to be set forth are performed by the hardware graphics pipeline 406 which may take the form of any type of hardware. Such hardware implementation may include a micro-controller or any other type of application specific integrated circuit (ASIC). More information on one exemplary embodiment of the hardware graphics pipeline 406 will be set forth in greater detail during reference to FIG. 5. The configuration of the graphics pipeline and general control over rendering operations is provided by the processor 401 which may also prepare appropriate geometry and basis values.

Figure 4:
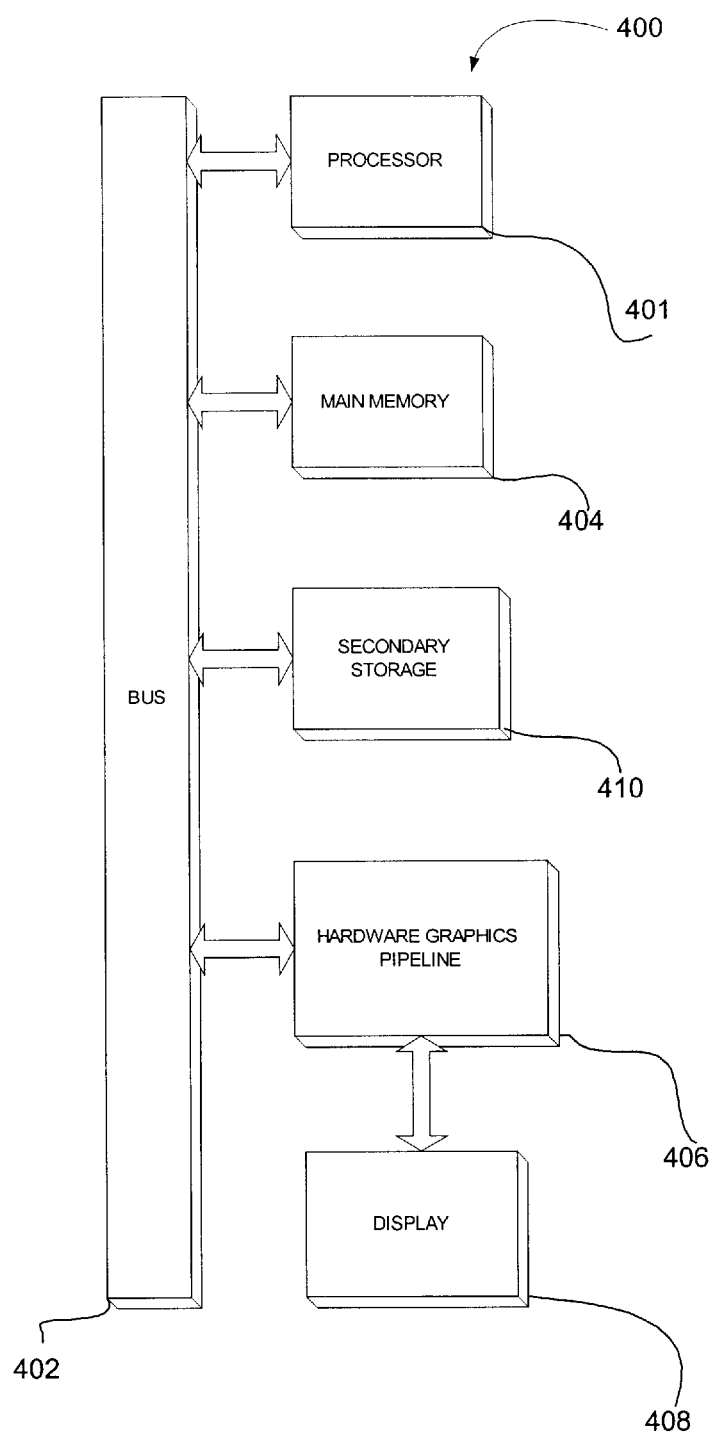
FIG. 4 is a block diagram of a digital processing system.
Figure 5:
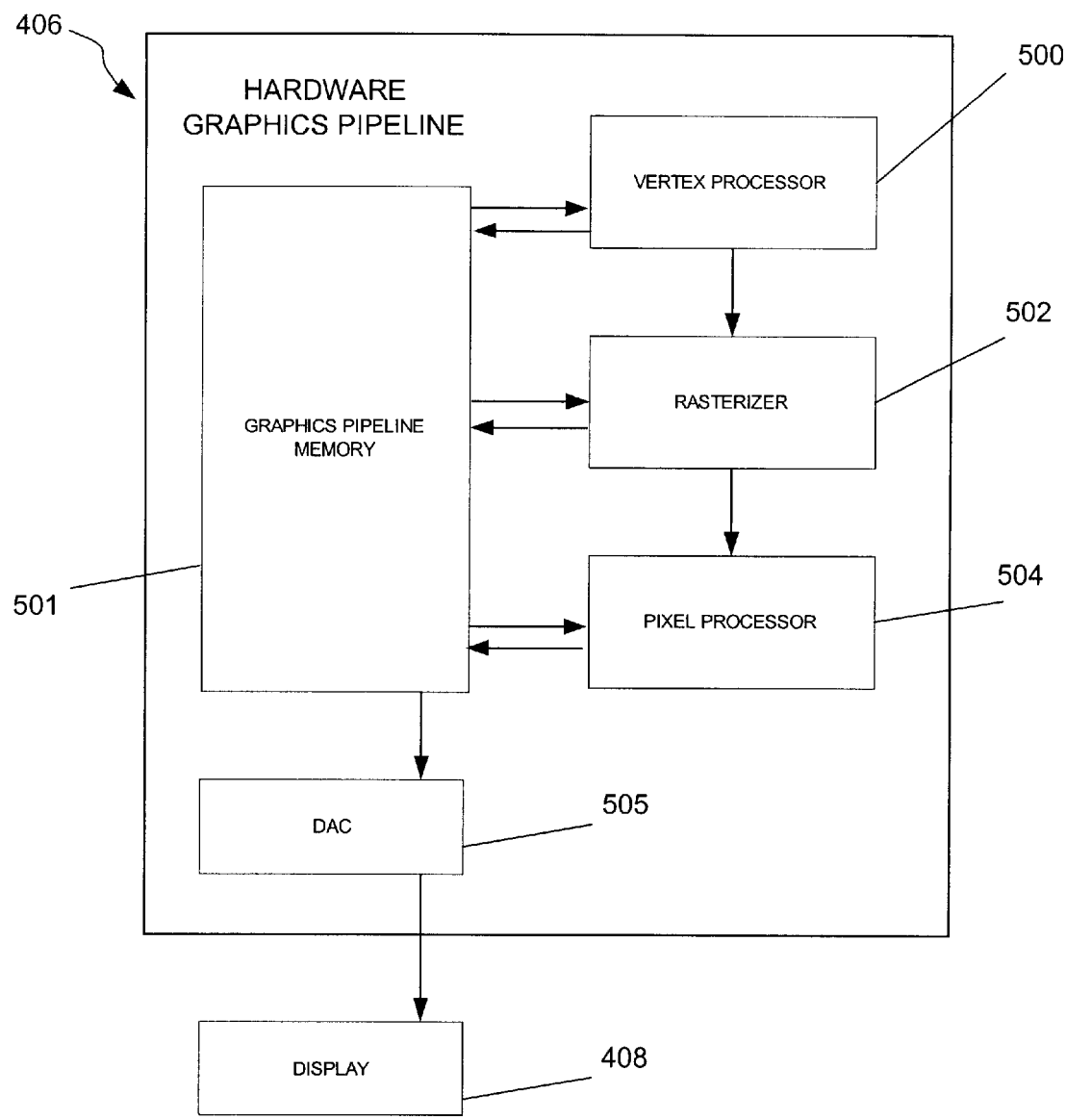
FIG. 5 illustrates the hardware graphics pipeline of FIG. 4, in accordance with one embodiment.

FIG. 5 illustrates the hardware graphics pipeline 406 of FIG. 4, in accordance with one embodiment. As shown, the hardware graphics pipeline 406 may include a vertex processor portion 500 capable of performing various operations (i.e. transformation, lighting, etc.) on graphics data in the form of vertices in the hardware graphics pipeline 406. Further included is a rasterizer 502 coupled to the vertex processor portion 500 for receiving the processed vertices therefrom. Such vertices define primitives. In the context of the present description, primitives may include, but are not limited to planar polygons. Alternate graphics primitives, for alternate embodiments, include: points, lines, quadratic patches, constructive solid geometry surfaces, and other higher order primitives. In use, the rasterizer 502 converts the primitives to fragments that correspond to a pixel in a frame buffer render target. Further, a digital-to-analog converter (DAC) 505 and pipeline memory 501 may be incorporated in a well known manner.

Once rasterized, the fragments are processed by a pixel processor portion 504 which is coupled to the rasterizer 502. Despite the term "pixel processor" 504, it should be noted that such portion processes texture fragments and/or pixels. Such processing may include, but is not limited to texturing, shading, texture coordinate perturbation, etc. More information on one exemplary embodiment of the pixel processor portion 504 will be set forth in greater detail during reference to FIG. 5A.

Of course, any of the foregoing components of the hardware graphics pipeline 406 may or may not be configurable in any desired fashion. Further, the various techniques to be described herein may be implemented in any one or more of the components of the hardware graphics pipeline 406, per the desires of the user.

Figure 5A:
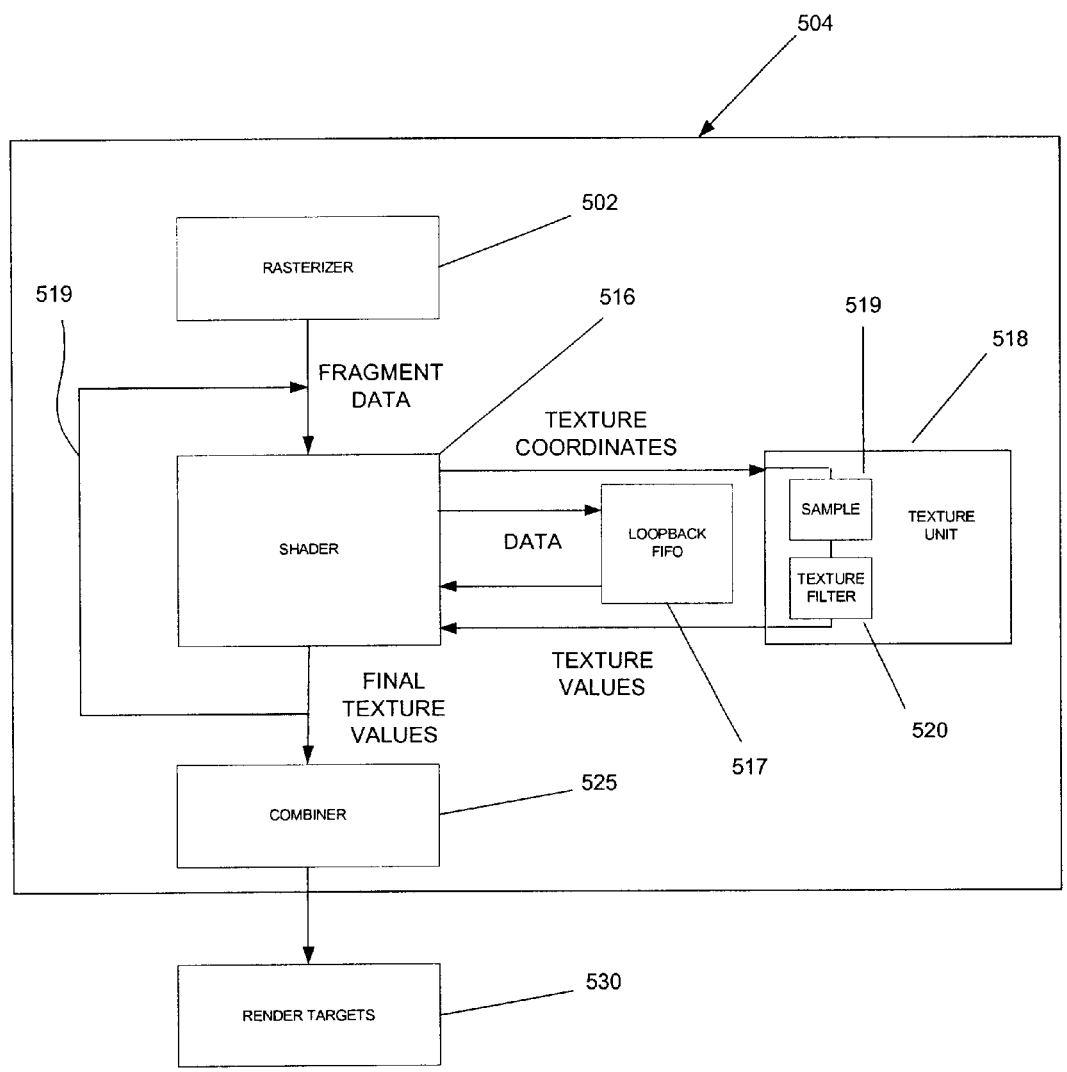
FIG. 5A shows an illustrative hardware implementation of the pixel processor portion of the hardware graphics pipeline of FIG. 4, in accordance with one exemplary embodiment.

FIG. 5A shows an illustrative hardware implementation of the pixel processor portion 504, in accordance with one exemplary embodiment. As shown, included is a shader module 516 coupled to the rasterizer 502, a texture fetch module 518, and a combiner 525 coupled to form a portion of the hardware graphics pipeline 406. For reasons that will soon become apparent, a feedback loop 519 is coupled between an output of the shader module 516 and an input thereof. It should be noted that the rasterizer 502 operates in a manner as set forth during reference to FIG. 5. While the combiner 525 may be implemented in any desired manner, one exemplary implementation is disclosed in a co-pending application entitled "Improved Graphics Pipeline Including Combiner Stages" filed Mar. 20, 1999 naming David B. Kirk, Matthew Papakipos, Shaun Ho, Walter Donovan, and Curtis Priem as inventors, and which is incorporated herein by reference in its entirety.

With continuing reference to FIG. 5A, the various inputs and outputs are shown for each of the components. The rasterizer 502 generates fragment data (i.e. interpolated vertex data, edge distances, pixel depth) which are used by the shader module 516 and texture fetch module 518. Also shown is an optional feedback first-in first-out (FIFO) buffer. When the feedback loop 519 is not utilized, the temporary data calculated internally by the present embodiment may be dropped before being sent to the texture fetch module 518. As an option, data may be reused each time a particular group of pixels, or "quad," goes through the shader module 516. If, for example, new vectors are generated during one pass, these vectors may continuously be associated with the quad on subsequent passes. Further, more than one fragment may be processed at a time while employing the feedback loop 519.

Figure 3:
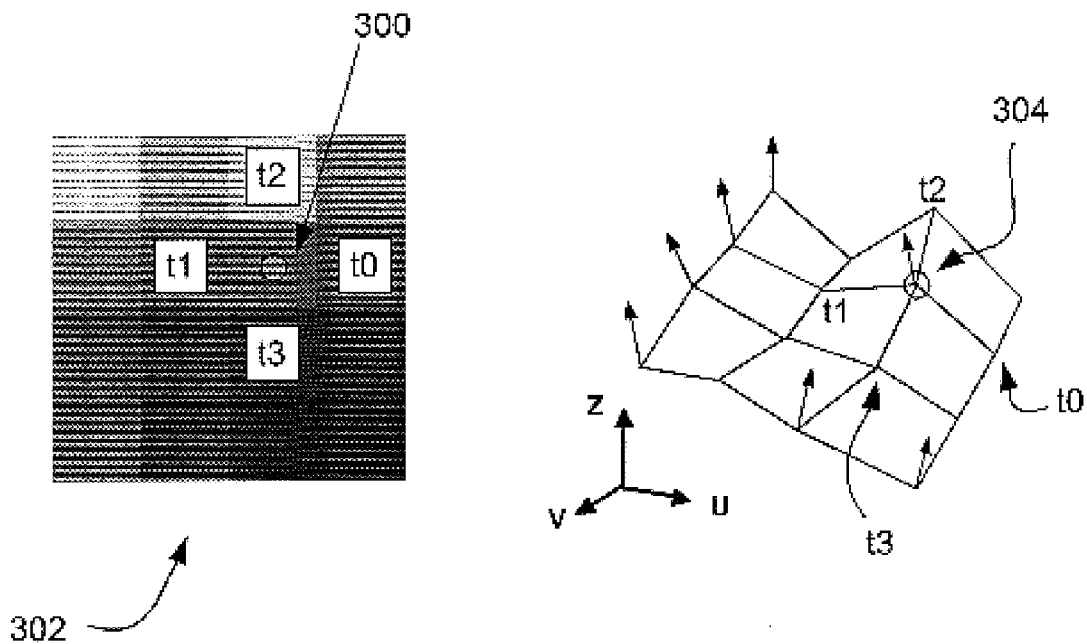
Figure 3A:
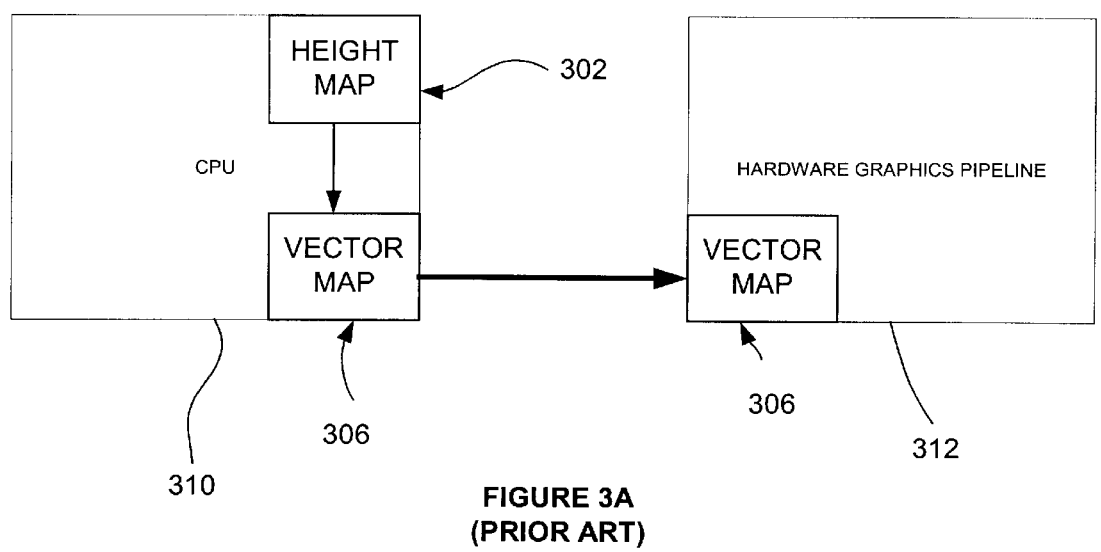

The prior art method for making vector map data available to a graphics hardware pipeline is illustrated in FIG. 3. For illustrative purposes, the following method is set forth in the context of creating a surface normal map from an existing height map. This single example should not be construed as limiting in any manner, as the invention may be applied to a variety of vector map formulations for various purposes including physical simulation of vector data and other applications described below. As illustrated in FIG. 3A, the height map data 302 is processed by the CPU 310 to yield vector map data 306. To be used in rendering, this data must be transferred across a bus to the graphics pipeline 312. The CPU may stall while waiting for this transfer to proceed, and the graphics pipeline may stall while waiting for the transfer to complete.

It should be noted that while a method using four adjacent samples is set forth herein, any number of neighbors may be sampled and combined using various filtering operations to produce the desired vector. In the context of the present description, the samples from which vectors are derived are referred to as basis values.

Figure 6:
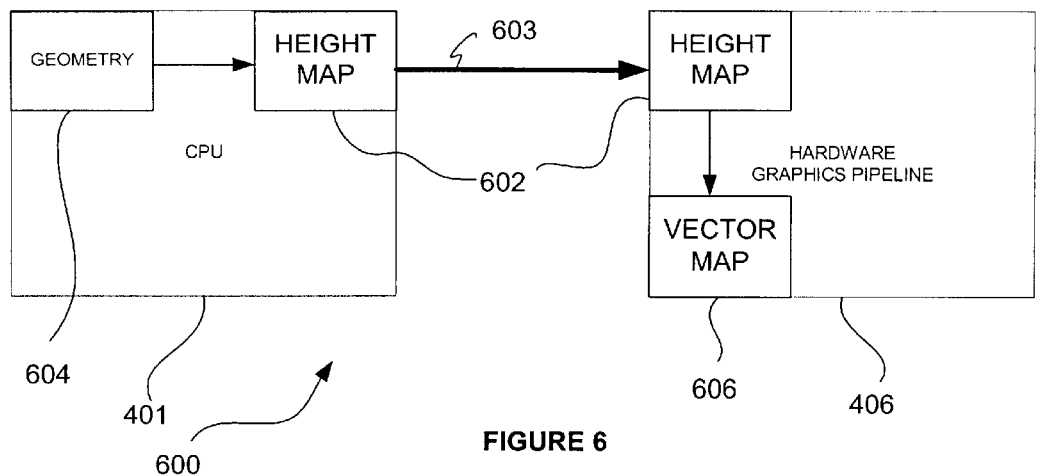
FIG. 6 illustrates one way in which a dedicated hardware graphics pipeline may be used to generate a vector map, in accordance with one embodiment.

Using the method of the present invention, the calculation of the vector normal map may instead be performed within a dedicated hardware graphics pipeline as illustrated by FIG. 6. This involves configuring one or more filters in the graphics pipeline such that during the act of rendering, the height map texture data is sampled and filtered to produce vector map data. Under the prior art method of FIG. 3A, a pre-computed vector map would be read by a shading unit 504 at each texel and used according to the purpose of the vector map data. Using one embodiment of the present invention, the shading unit may instead read a neighborhood of height map values, and generate the vector map values. The vector map values are then available to the remainder of the shading unit rendering calculations, where they are used in rendering as they would be used if fetched instead from a pre-computed vector map under the prior art method. This aspect of the invention constitutes generating the vector map values on demand as needed.

In one embodiment, the configuration may involve selecting one of a plurality of transforms in a hardware graphics pipeline. In the context of the present description, the transforms may include any transformation operation capable of generating the desired vector map.

Calculating the vector map values on demand in this way has several advantages over the prior art. It is often the case that only a small portion of the vector map is needed during rendering. By calculating only the portion required, a savings of calculation may be achieved. In the case where the height map data is being animated and so is changing for each rendering operation, this savings is especially significant. Under the prior art method of FIG. 3, the required portion is not known or prohibitive to compute, making this savings impossible or impractical under the prior art method. Rather than being discarded after use by the shader, the hardware graphics pipeline may be configured to write the calculated vector map values to a texture. It may do this concurrently while using the vector map values for further rendering pixel color values (i.e. any color values associated with a particular pixel) and writing a final output color to one or more frame buffers, or it may devote the entirety of its processing to calculating the vector map and writing out the vector map values to a texture for later use. In this way, the vector values are cached and redundant calculations of vector map values from unchanging basis values may be eliminated.

FIG. 6 illustrates one way 600 in which the dedicated hardware graphics pipeline 406 may be used to generate a vector map 606, in accordance with one embodiment. While the present technique may be carried out in the context of the foregoing architecture, it should be noted that it may also be implemented in any other desired context. FIG. 6 depicts a basic case in which a height map 602 is generated by the CPU and transferred to the hardware graphics pipeline 406 across the system bus 603. The graphics pipeline then generates a vector map from the height map.

Figure 6A:
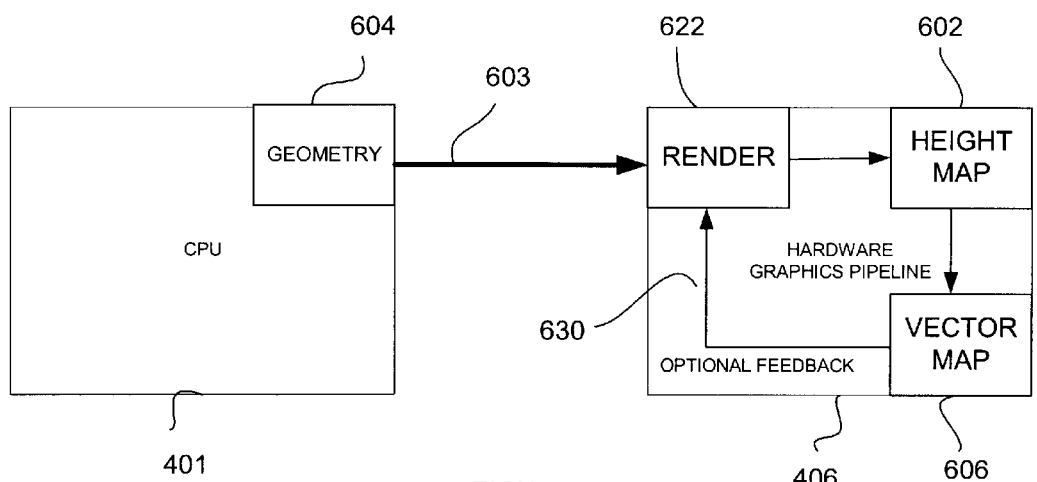
FIG. 6A illustrates one way in which a dedicated hardware graphics pipeline may be used to generate not only a vector map, but also a height map, in accordance with another embodiment.

FIG. 6A depicts one way in which the dedicated hardware graphics pipeline may be used to generate not only a vector map 606, but also a height map 602, in accordance with another embodiment. In this case, rendered pixel depth values may form the height map. FIG. 6A also shows an optional feedback loop 630 whereby the resulting vector map may be used to modify it or other maps. This enables animation of the maps in real time using the hardware graphics pipeline. While these diagrams show a simple case of two hardware texture maps and one feedback path, the method may employ a plurality of maps and feedback paths. More information regarding the manner in which the vector map 606 is generated will be set forth in greater detail during reference to subsequent figures.

FIG. 7 depicts the steps involved in the configuration 700 of the hardware graphics pipeline in accordance with one embodiment. An example of how this may be carried out is provided in Table 1 below. Texture and shader data is bound to the pipeline in step 701. Sampling the required basis values is specified 702, as well as the method 703 by which the basis values are to be processed to yield vectors. The pipeline is also directed in operation 704 to output data to one or more render targets.

FIG. 8 depicts the steps carried out by the graphics pipeline in the act of rendering according to the configuration 700 established previously. It also depicts an optional feedback loop 810 whereby calculated values may be used to control additional sampling of basis values. This rendering writes visible pixels to a frame buffer as in operation 804 and/or writes vector map data to a texture or other render target as in operation 805. FIG. 9 depicts the basic rendering loop in which the hardware graphics pipeline is configured and rendering progresses. Each circuit through this loop may render all or part of a scene including intermediate steps not visible in the final rendered image.

The steps of FIG. 8 are typically carried out by the pixel processor 504. Several methods may be employed by the shading unit 504 to compute the vector map values. The shading unit may supply a single set of texture coordinate data (texture coordinates and an optional plurality of derivatives and values used to establish texture level-of-detail or the means of filtering), and the texture filter 520, ordinarily used for bi-linear, tri-linear, or anisotropic filtering of texture data, may be configured in such a way as to sample any number of adjacent texels, for example t0, t1, t2, and t3 as in FIG. 3 and FIG. 11, and perform all necessary differencing and calculations to generate the vector value. The resulting vector value is supplied to the shader 516. Alternatively, the shading unit may supply several sets of texture coordinate data 515 and receive each sample t0, t1, t2, and t3 to the shader 516. The shader 516 then performs all necessary calculations to generate the vector value.

Additionally, the shader 516 may utilize the loopback FIFO 517 to facilitate these calculations, or the shader may pass on the height map values to the combiner 525 which computes the vector map values.

The hardware graphics pipeline may be configured according to the various methods above by design or through various commonly used graphics application programming interfaces (APIs). These include OpenGL® and Microsoft's® DirectX™ versions 8.0 and later, both of which are known to those of ordinary skill. Since the texture filter 520 may or may not be configurable by the user, the present embodiment is presented whereby the shader 516 and combiner 525 are configured to produce the desired vector map values.

Exemplary Embodiment

A particular example of implementing the foregoing concepts will now be set forth. The following example is set forth for illustrative purposes only, and should not be construed as limiting in any manner. Though this example is described in terms of Microsoft's® DirectX™ 8 graphics API, the operations may be expressed in any other suitable graphics API including OpenGL®.

As stated above, to generate a vector map value at each pixel being rendered, it is often necessary to supply a local area of values, which one may choose to call the basis values, from which the vector value may be calculated. Here the local area may be local in space, time, or any other parameter coordinate value. For this example, a local area is chosen in space. These basis values may be delivered to the graphics pipeline by establishing a collection of texture coordinates from which to sample textures containing the basis values. An object is supplied to the graphics pipeline with a default texture coordinate mapping as established by the user. This default mapping determines the orientation and scale of the basis texture across the object. By the present method, the graphics pipeline is configured to calculate a plurality of new texture coordinate sets from the default texture coordinate mapping. Each set of texture coordinates is computed as an offset from the default mapping and determines the coordinates of a neighbor texture sample. By calculating several such texture coordinate sets, several neighbors are sampled to provide the necessary local area of basis values. The new texture coordinate sets may be calculated by the rasterizer 502, shader 516, texture unit 518, or any other suitable part of the graphics pipeline, but for the purposes of this example the vertex processing unit 500 is used.

Figure 11:
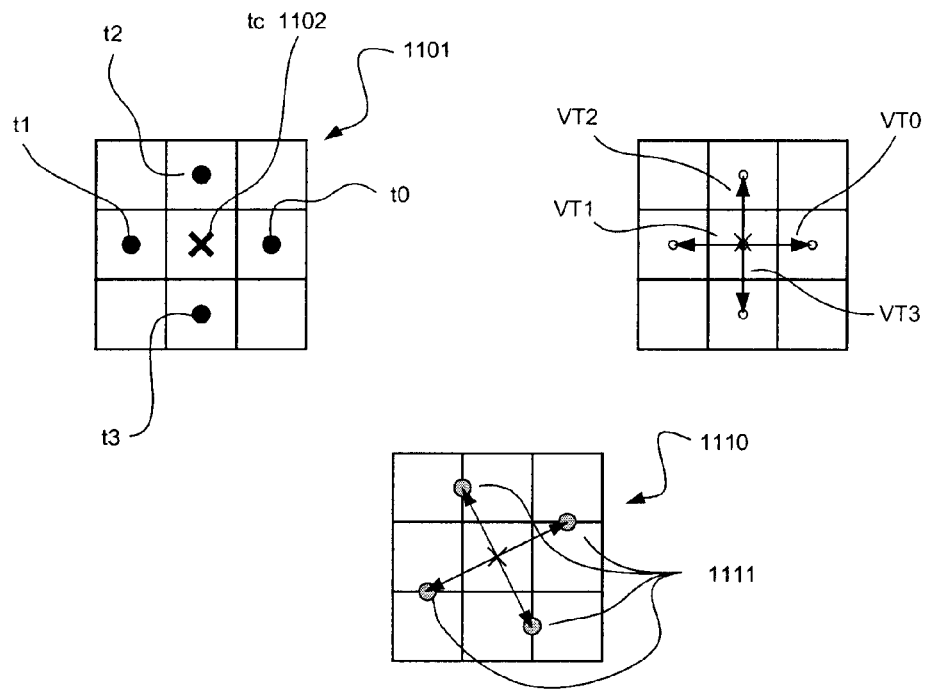
FIG. 11 depicts the eight nearest neighbors of a texel, and various patterns of sampling the neighbors according to texture coordinate offset vectors.
Figure 12:
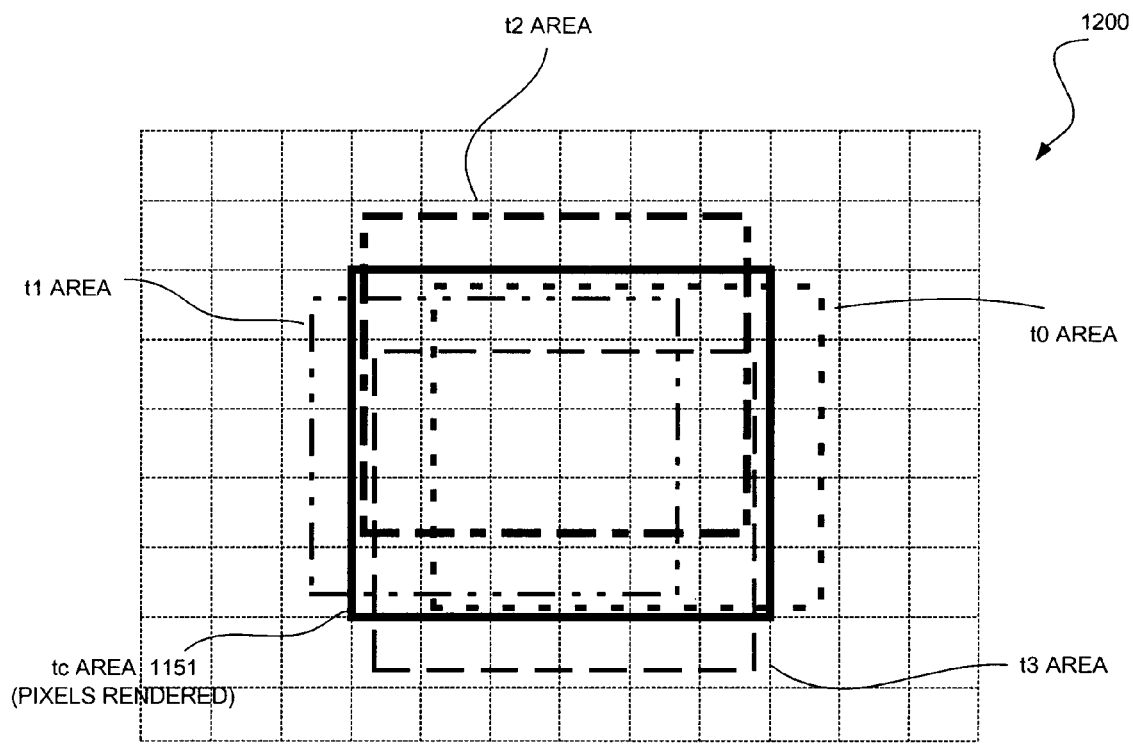
FIG. 12 illustrates the manner in which one set of texture coordinate offsets, as in FIG. 11, sample various areas of a texture for an area of pixels rendered.

FIG. 11 depicts the eight nearest neighbors 1101 of a texel 1102, and the manner in which the nearest neighbors t0, t1, t2, t3 may be specified by vector texture coordinate offsets VT0, VT1, VT2, VT3 from a default texture coordinate. The 'X' of FIG. 11 denotes the texel in the location of the current pixel being rendered. The vectors of 1110 depict a means by which all eight neighbors maybe sampled by placing four bilinear samples 1111 exactly between pairs of neighboring texels. The texture coordinate offsets may be any magnitude and sample texels any distance or orientation from the center. They need not define a symmetrical pattern as they do here. Also, they may vary for each pixel rendered. FIG. 12 illustrates a texture map 1200 whose texels have a one-to-one correspondence to an area of pixels rendered 1200. The areas covered by the offset texture samples t0 through t3 for the given pixels rendered are shown with dotted lines.

After fetching the basis values, they are processed to yield the desired vector. This processing is denoted by the filter steps 1006, 1010, 1012 of the associated diagrams and may be carried out by the shader 516, texture filter 520, or combiner 525 stages. The processing may include, and is not limited to, calculating differences between samples, dot products, cross products, gradients, and other scalar and vector field quantities such as the curl or divergence. The mathematical steps of calculating a vector from the set of basis values may be identical to those of prior art methods.

Once the desired vector value has been calculated in the graphics pipeline, it may be used in rendering the scene, written to a texture map for later use, or both. In this embodiment, the vectors are written to a texture render target.

Specific details for the conversion of a height map to a vector normal map will now be provided below in the context of pseudo-code for Microsoft's® DirectX™ 8 graphics API. Table 1 lists pseudo-code executed on the CPU to configure and initiate the graphics pipeline processing. This specific method is in accordance with FIG. 6.

Lines 1 and 2 declare a square object of four vertices which span in space from (−1,−1) to (1,1) and in texture coordinates from (0,0) to (1,1). This object may cover the entire render target, and when the source and render target textures are the same resolution, there may be a one-to-one correspondence between texels of the height map and pixels of the destination.

Line 3 binds a single source height map texture to four texture units numbered zero to three, that they may read the height map values. Line 3 may alternately bind separate textures to each of the units 0, 1, 2, and 3.

Lines 4–8 establish four vectors which are the displacements to each neighbor sample. These displacements are illustrated in FIG. 11 1102 as VT0 through VT3.

Line 9 declares a vertex shader accepting position and texture vertex information to configure the vertex processor 500. This vertex shader operates on each input vertex producing output values which are sent to the graphics pipeline rasterizer, and the shader configures the graphics pipeline to process each vertex of the object according to the instruction lines 10 through 14.

Line 10 copies the input vertex position to the output vertex position, oPos, preserving the correspondence of rendered pixels to the basis values.

Line 11 creates a new texture coordinate based on the default mapping but offset by vector Neighbor_0 passed to the graphics pipeline as a vertex shader constant value. The effect is to create a new texture mapping across the square object as illustrated in FIG. 12, such that an area of texels offset from the default mapping is supplied through the t0 texture sample. This establishes that for each pixel rendered, the t0 texture sample may be offset by the texture coordinate Neighbor_0 or VT0 from its corresponding texel of the height map basis values.

Lines 12–14 create three other sets of texture coordinates, such that the neighboring texels t1, t2, t3, shown in FIG. 11 and FIG. 3, are supplied to the shader unit 516 in rendering each pixel.

Lines 15 through 44 affect the Pixel Processor 504 portion of the hardware graphics pipeline. Line 15 declares a number from zero to one which may be used to scale the normal map values. Line 16 begins the declaration of a pixel shader that configures the shader 516 and combiner 525. Two constants c[PCN_RED_MASK] and c[PCN_GREEN_MASK] are declared which may act as color masks for accumulating and scaling results. Line 18 establishes the pixel shader version according to DirectX™ 8. Lines 20–22 define further constants. Each variable of the pixel shader is a four-component vector. Lines 24–27 fetch each texel of the source texture as bound to the four texture stages. In this way the neighbor texels of FIG. 11 are fetched and supplied to later calculations for each pixel rendered. Line 30 computes the slope of the height map samples in the horizontal texture axis. Line 34 computes the slope for the vertical axis. Lines 36–44 process the slopes to yield a normal map vector value in the output register zero, r0, which is then written to the pixel being rendered. Line 46 directs the computed pixels to be rendered into a vector normal map texture, NormalMap, and thus be made available for later use. It should be noted that with a longer shader program (lines 16–44), one could have used the r0 result immediately in a lighting calculation or for some other purpose. Line 47 submits the object to the graphics pipeline, causing the vertex shader and pixel shader to be executed and the vector normal map to be filled with values calculated in the pixel shader. Subsequent rendering calls after this pseudo-code example are then free to use the vector normal map texture, NormalMap, in any way they like, including supplying the normal map back into the shader as in Line 3.

TABLE 1

```
1   Object.POSITION[4] = ((-1, 1), (1, 1), (1, -1), (-1, -1)
2   Object.TEX_COORD[4] = ((0,0), (,0), (1,1), (0,1)
3   SetTexture( 0..3, HeightMap );
4   float vt0[2] = Neighbor_0;
5   float vt1[2] = Neighbor_1;
6   float vt2[2] = Neighbor_2;
7   float vt3[2] = Neighbor_3;
8   SetvertexShadercontant( Const0. .Const3, vt0. .vt3 );
9   SetvertexShader( POSITION | TEX_COORD,
10  oPos = POSITION
11  oT0 = TEX_COORD + Const0
12  oT1 = TEX_COORD + Const1
13  oT2 = TEX_COORD + Const2
14  oT3 = TEX_COORD + Const3 );
15  float sc = [0,1]; // any number in 0 to 1 ranye
16  SetpixelShader( #define c[PCN_RED_MASK] = (sc,0,0,0),
17  #define c[PCN_GREEN_MASK] = (0,sc,0,0),
16  ps.1.1
20  def c4, 0.0, 0.0, 1.0, 1.0 // blue, alpha mask
21  def c2, 0.5, 0.5, 0.0, 0.0
22  def c1, 1.0, 1.0, 0.0, 0.0
24  tex t0 // fetch from TEX_COORD + vt0
25  tex t1 // fetch from TEX_COORD + vt1
26  tex t2
27  tex t3
29  // (t0 − t1)*4
30  sub_x4 r0, t0, t1
31  // t0 = s result in red
32  mul    t0, r0, c[PCN_RED_MASK]
33  // r1 = t result in green
34  sub_x4 r1, t3, t2
35  // r0 = s,t,0,0
36  mad    r0, r1, c[PCN_CREEN_MASK], to
37  // t1 = (2 * s¨2, 2 * t¨2, 0.0)
38  mul_x2 t1, r0, r0
39  // ( 1-2s,¨2 + 1-2t¨2)/2 = 1-s¨2-t¨2
40  dp3_d2 r1, 1-t1, c1
41  // bias red, green to 0.5
42  add    r0, r0, c2
43  // r0 output RCB = (r+0, g+0,0 0+blue)
44  mad    r0, r1, c4, r0 );
46  SetRenderTarget (NormalMap);
47  DrawPrimitive(Object, 4);
```

Table 1. Pseudo-code whereby the CPU configures and initiates the processing of the graphics pipeline for the purpose of generating vector normal map data from an input height map in accordance with one embodiment. The characters '//' are comment delimiters as in standard C++.

The above pseudo-code calculates a normal map in a biased-and-signed format, where numbers in the range [−1, 1] are biased and scaled to the range [0,1] for storage in a texture. Other number formats for storage are useful, and the desired format is easily established with the pixel shader portion. Among these useful formats is a two's-complement format, the creation of which is illustrated in the pixel shader of Table 2 below.

TABLE 2

```
SetPixelShader(
ps.1.1
// Define c[PCN_BLUE_MASK] as RGBA = (0, 0, scale, 0)
// Where scale [0,1] is applied to reduce the magnitude
// of the s axis component of the normal.
// Define c[PCN_GREEN_MASK] similarly to affect the
// t axis component
// Define RGBA constants
def c1, C.5, 0.5, 0.5, 0.5
def c2, 0.0, 0.0, 1.0, 0.0
def c3, 0.0, 0.0, 0.0, 0.0
// Mask for green component only
def c4, 0.0, 1.0, 0.0, 0.0
// Mask for blue component only
def c5, 0.0, 0.0, 1.0, 0.0
// yet colors from all 4 texture stayes
// t0 = -s, 0 as set by texture coords.
// t1 = +s, 0
// t2 = 0, +t
// t3 = 0, -t
tex t0
tex t1
tex t2
tex t3
// Compute differences in height for both axes
sub_x4    r1.rgb, t3, t2        // (t3-t2)*4;  *4 for hiyher
                                              scale
+ sub_x4  r1.a, t0, t1          // (t0-t1)*4
add       r0, r1, c1            // bias b and a up by 0.5
mul       t2, -r1,
          c[PCN_EMBM_SCALE]
cnd       t0, r0.a, -t2.a, 1-t2.a   // correct s-axis diff.
                                    // in twos-conplement
dp3       r0.rgba, r0, c2       // blue to alpha for next cnd
// This cnd is for the blue (or 'T' or 'V') axis
cnd       t1, r0.a, -t2, 1-t2   // corrected blue in blue chan
mul       t0, t0, c4            // 1st axis diff to green only
mad       r0, t1, c5, t0        // 2nd axis diff to blue only,
                                // add green and blue to create
                                // the final output
);
```

Table 2. Pseudo-code for the creation of a vector displacement map with numbers in two's-complement format in accordance with one embodiment. This portion may be used in the manner of lines 16–44 of Table 1.

While the present technique may be used in the context of any desired application, one application involves the formulation and use of a vector map for per-pixel fluid simulation and rendering. The mathematical basis of this simulation is similar to that described by Gomez in "Interactive Simulation of Water Surfaces," Game Programming Gems, Charles River Media Inc., 2000: pp. 187–194; which is incorporated herein by reference in its entirety.

Whereas Gomez calculates a height-based water simulation on the CPU using a 2D array of geometric vertex data, by the method of this invention, one is now able to perform a similar simulation on texels of a texture map within the rendering operations of a graphics pipeline. Algorithms such as this may be developed into a series of rendering operations that use vector map textures to represent the water height, velocity, and force.

Figure 13:
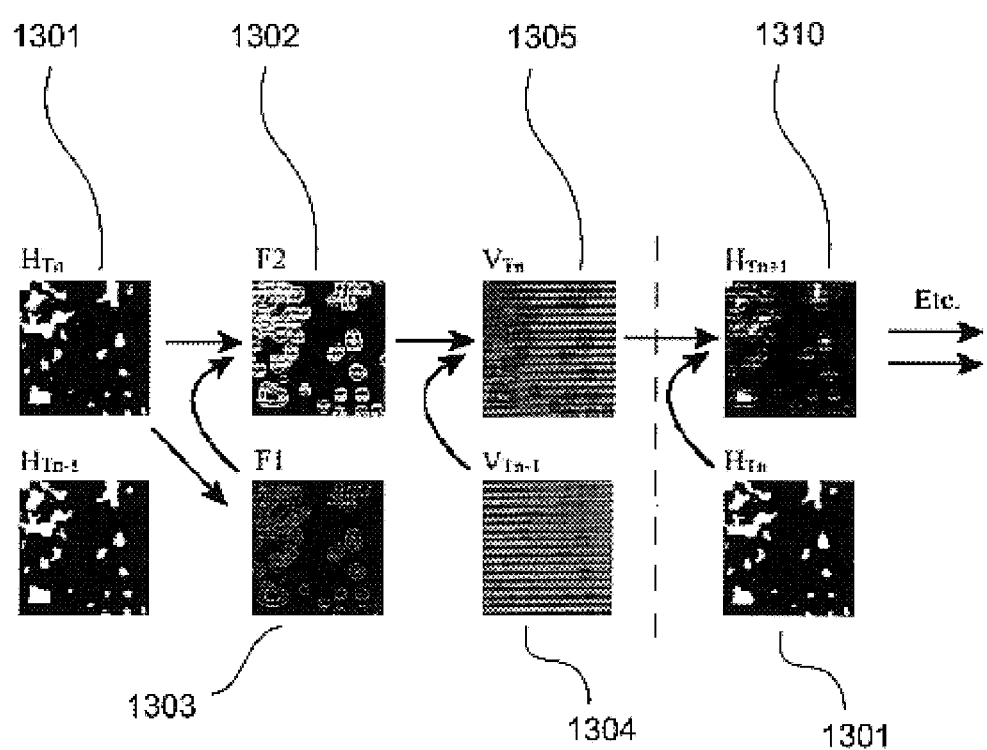
FIG. 13 illustrates one implementation of a rendering loop used to create a continuous non-repeating animation, in accordance with one embodiment.

Such a simulation progresses as in FIG. 13, whereby an initial height distribution at time t=n, Ht(n) 1301, is sampled in a local area about each texel. The local heights are used to compute a force acting at each texel, F2 1302, the values of which are accumulated over, in this case, two rendering operations. The first step accumulates a partial force, F1 1303, and the next step adds the final terms by sampling both Ht(n) 1301 and F1 in rendering to F2. This total force, F2, is applied to a velocity vector map Vt(n−1) 1304 resulting in an updated velocity field Vt(n) 1305. This velocity field is then used to perturb the original input height field, Ht(n) 1301, yielding a height field at the next time value, Ht(n+1)

1310. This height field is then supplied in place of the previous, Ht(n), thus forming an iterative feedback loop.

Each time around this loop results in all elements of the height field being updated by one time step of the physics simulation, and the loop may be carried out any number of times. The result is a continuous non-repeating animation of the height map data carried out by the rendering operations of the graphics pipeline. In addition, the height map may be supplied as the input to the code of Table 1, resulting in a vector normal map for each step of the animation. This normal map may then be used to render the reflections and refractions of a realistic water surface. It should also be noted that at each step, a perturbation may be rendered into any of the vector data maps Ht(n), F1, F2, Vt(n), etc., and this disturbance may then evolve over time according to the simulation. For example, a local bright spot rendering into the height texture may naturally spread into multiple ripples as a droplet falling into a pond. The maps Ht(n), F2, Vt(n), etc. may be contained in the separate color channels of a single texture or any may exist in its own separate texture map.

Figure 10:
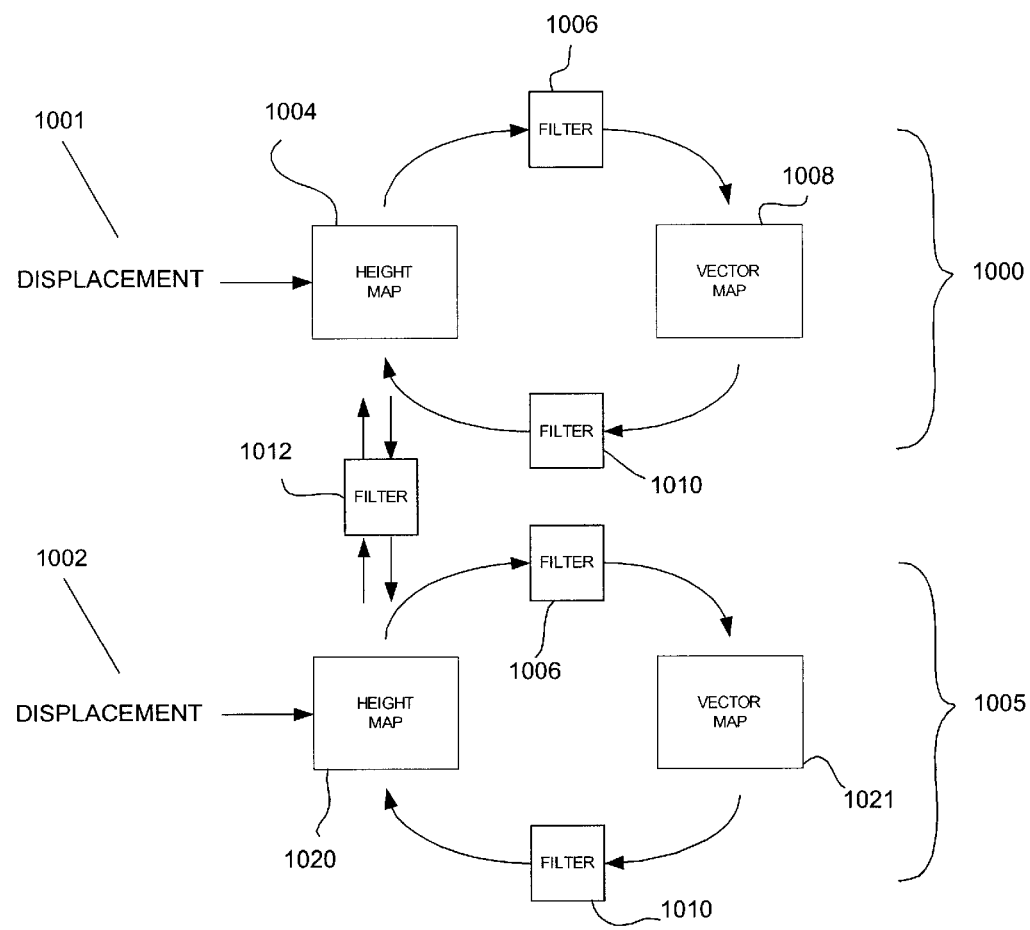
FIG. 10 illustrates a technique within the graphics hardware for using the principles of the present invention.

Taking this approach a step further, two or more such simulations may be run in parallel as illustrated by FIG. 10, and coupled together by rendering a portion of one simulation's data into the other via the filter step 1012. This step involves the method of Table 1, whereby geometry is supplied to cover the area of coupling, an area of texels is sampled in the process of rendering each pixel of said geometry, and these samples are processed according to a configurable filter as established by a different pixel shader configuration in place of lines 16–44.

Displacements 1001, 1002 may be incorporated to represent water droplets or a character moving through the simulated water. In such a method, one simulation loop 1000 may be configured to give rise to maps which tile seamlessly when placed side by side, and the other simulation loop 1005 may give rise to a local detail texture. The coupling 1012 between the two then allows the detail texture to blend seamlessly with the tiled texture. A large surface may be represented by the tiled texture, while the detail texture provides localized unique features. Both animate and evolve over time according to the nature of the simulation established by the filter steps 1006 and 1010.

The foregoing techniques may also be applied to the solution of partial differential equations, where rendering operations of the graphics pipeline converge to a solution over several time steps. For more information relating to such application, reference may be made to an application entitled "System and Method for Computing Partial Differential Equations in a Hardware Graphics Pipeline" filed coincidently herewith and naming inventor Gregory Edward James under U.S. application Ser. No. 10/099,721 and which is incorporated herein by reference.

In the above embodiments, vector data representing geometric or physical quantities is created in the hardware graphics pipeline. It is also possible to devise vectors representing a logical condition and employ these vectors in various ways. For example, based on a sample of neighboring colors, the shader of Table 3 may be used to generate a contrast value between neighbor samples. A threshold may then be applied to this contrast value, and the result is a form of edge detection in a hardware graphics pipeline. The vector may also be created in the graphics pipeline to contain a count of the number of neighbors with a certain condition (i.e. 'on' or 'off' neighbors) surrounding each texel as well as information about the state of the texel itself (i.e. 'on', 'off', or 'health'). Such a vector formulation may be used in the context of a cellular automata program. For more information relating to such application, reference may be made to an application entitled "Hardware-Implemented Cellular Automata System and Method" filed coincidently herewith and naming inventor Gregory Edward James under U.S. application Ser. No. 10/098,833 and which is incorporated herein by reference.

TABLE 3

```
SetPixelShader
ps.1.1
// luminance conversion constant
def c1, 0.3f, 0.59f, 0.11f, 0.0f
// get colors from all 4 texture stages
tex t0
tex t1
tex t2
tex t3
dp3    r0 rgba, t0, c1    // t0 to luminance, store in r0 a
dp3    r1.rgba, t2, c1    // t2 to luminance, store in r1.a
dp3    r0.rgb, t1, c1     // t1 to luminance, in r0.rgb
dp3    r1.rgb, t3, c1     // t3 to luminance, in r1.rgb
sub_x4 r0, r0, r1         // r0=(r0 – r1)*4
nul_x4 r0, r0, r0         // square both differences
                          // conbine .rgb and .a values
                          // 1-(r0.rgb + r0.a) = (1 – r0.rgb)-r0.a
sub_sat  r0.rgb, 1-r0, r0.a
);
```

Table 3. Pseudo-code for a DirectX™ pixel shader used to create a contrast value corresponding to each texel of the source texture. Such a shader may be used in place of the pixel shader declared on line 16 of Table 1.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for creating a vector map in a hardware graphics pipeline, comprising:
   selecting one of a plurality of transforms in the hardware graphics pipeline;
   processing input to generate the vector map utilizing the selected one of the plurality of transforms in the hardware graphics pipeline;
   rendering a plurality of pixel color values utilizing the vector map; and
   repeating the processing for further processing the vector map in multiple passes by way of a feedback loop that is biased by a gravity vector.

2. The method as recited in claim 1, wherein the input includes a height map.

3. The method us recited in claim 1, wherein the height map is generated by the hardware graphics pipeline.

4. The method as recited in claim 2, wherein the height map is stored in the hardware graphics pipeline and is capable of being updated by a central processing unit.

5. The method as recited in claim 4, wherein the height map is capable of being updated for saving bandwidth between the central processing unit and the hardware graphics pipeline.

6. The method as recited in claim 1, wherein the vector map includes a bump map.

7. The method as recited in claim 1, wherein the vector map includes a normal map.

8. The method as recited in claim 1, wherein the vector map includes an environment-mapped bump mapping displacement map.

9. The method as recited in claim 1, wherein the vector map includes a displacement map.

10. The method as recited in claim 9, wherein the displacement map includes both positive and negative displacements.

11. The method as recited in claim 1, wherein the vector map includes a biased and scaled displacement map.

12. The method as recited in claim 1, wherein the input is generated based on geometry information.

13. The method as recited in claim 1, wherein the input is processed utilizing a rendering process of the hardware graphics pipeline.

14. The method as recited in claim 1, wherein the input takes the form of textures.

15. The method as recited in claim 2, wherein the height map includes a plurality of height map values that are each received in the form of a texel.

16. The method as recited in claim 2, and further comprising filtering the height map prior to the processing.

17. The method as recited in claim 15, wherein the processing further includes sampling a plurality of neighboring texels surrounding a texel corresponding with each height map value in order to generate vectors.

18. The method as recited in claim 17, wherein the sampling includes calculating a plurality of offset values associated with each height map value of the height map.

19. The method as recited in claim 18, wherein the offset values are each associated with one of the neighboring texels.

20. The method as recited in claim 19, wherein the offset values are each calculated by adding a vector value and another value.

21. The method as recited in claim 18, wherein the sampling further includes generating a plurality of vectors based on the offset values.

22. The method as recited in claim 21, wherein the vectors include gradient values.

23. The method as recited in claim 21, wherein the processing further includes generating vector map values associated with the height map values based on the vectors.

24. The method as recited in claim 21, wherein the processing further includes normalizing the vectors.

25. The method as recited in claim 1, wherein the processing is repeated in a programmable manner.

26. The method as recited in claim 1, wherein the vector map is used to modify the height map.

27. The method as recited in claim 26, and further comprising filtering the vector map before using the vector map to modify the height map.

28. The method as recited in claim 1, wherein the selecting, the processing, and the rendering are replicated, and the processing is based on additional input.

29. The method as recited in claim 1, wherein the processing further includes writing the vector map values to a texture map.

30. The method as recited in claim 1, wherein the rendering occurs immediately following the processing.

31. The method as recited in claim 1, wherein the hardware graphics pipeline includes programmable pixel shader hardware.

32. The method as recited in claim 1, wherein the hardware graphics pipeline includes programmable vertex processing hardware.

33. The method as recited in claim 1, wherein the vector map is utilized for per-pixel fluid rendering.

34. The method as recited in claim 1, wherein the vector map is directly generated by processing input in the form of geometry information.

35. A system for creating a vector map in a hardware graphics pipeline, comprising:
   logic for selecting one of a plurality of transforms in the hardware graphics pipeline;
   logic for processing input to generate the vector map utilizing the selected one of the plurality of transforms in the hardware graphics pipeline;
   logic for rendering a plurality of pixel color values utilizing the vector map; and
   logic for repeating the processing for further processing the vector map in multiple passes by way of a feedback loop that is biased by a gravity vector.

36. A system for creating a vector map in a hardware graphics pipeline, comprising:
   means for selecting one of a plurality of transforms in the hardware graphics pipeline;
   means for processing input to generate the vector map utilizing the selected one of the plurality of transforms in the hardware graphics pipeline;
   means for rendering a plurality of pixel color values utilizing the vector map; and
   means for repeating the processing for further processing the vector map in multiple passes by way of a feedback loop that is biased by a gravity vector.

37. A system for creating a vector map, comprising:
   a hardware graphics pipeline for processing input to generate the vector map utilizing a selected transform;
   wherein the vector map is utilized during rendering with the hardware graphics pipeline;
   wherein the processing is repeated for further processing the vector map in multiple passes by way of a feedback loop that is biased by a gravity vector.

38. A method for creating a vector map, comprising:
   receiving a height map in a hardware graphics pipeline;
   processing the height map to generate the vector map utilizing a hardware graphics pipeline;
   outputting the vector map; and
   repeating the processing for further processing the vector map in multiple passes by way of a feedback loop that is biased by a gravity vector.

39. A method for creating a vector map in a hardware graphics pipeline, comprising:
   selecting one of a plurality of transforms in the hardware graphics pipeline;
   programmably processing input to generate the vector map utilizing the selected one of the plurality of transforms in the hardware graphics pipeline;
   repeating the selecting and the processing for further programmably processing the vector map via a feedback loop; and
   repeating the processing for further processing the vector map in multiple passes by way of a feedback loop that is biased by a gravity vector.

40. A method for rendering in a hardware graphics pipeline, comprising:
   generating a first height map in the hardware graphics pipeline;
   feeding back the first height map in the hardware graphics pipeline; and
   generating a second height map in the hardware graphics pipeline utilizing the first height map.

41. A method for creating a vector map in a hardware graphics pipeline, comprising:
   receiving a height map in the hardware graphics pipeline, wherein the height map includes a plurality of height map values that each take the form of a texel;
   utilizing a rendering process of the hardware graphics pipeline, processing in real-time the height map to generate the vector map utilizing the hardware graphics pipeline, the vector map being selected from the group consisting of a bump map, a normal map, an environment-mapped bump mapping displacement map, a two's-complement displacement map, and a biased and scaled displacement map, the processing including:

sampling a plurality of neighboring texels surrounding a texel corresponding with each height map value in order to generate vectors, the sampling including:

calculating a plurality of offset values associated with each height map value of the height map, wherein the offset values are each associated with one of the neighboring texels, and the offset values are each calculated by adding a vector value and another value, and generating a plurality of vectors based on the offset values, generating vector map values based on the vectors;

outputting the vector map values;

programmably repeating the utilizing and outputting by way of a feedback loop that is biased by a gravity vector, wherein the vector map values are used to modify the height map values and are filtered before being used to modify the height map; and writing the vector map values to a texture map.

42. A method for creating a vector map in a hardware graphics pipeline, comprising:

configuring the hardware graphics pipeline to sample, for each pixel rendered, an area of basis values from which vector data is calculated;

processing the basis values in the hardware graphics pipeline to yield vector data; and repeating the processing for further processing the vector data in multiple passes, wherein the processing is repeated by way of a feedback loop that is biased by a gravity vector.

* * * * *

UNITED STATES PATENT AND TRADEMARK OFFICE
CERTIFICATE OF CORRECTION

PATENT NO. : 6,765,584 B1  
APPLICATION NO. : 10/099770  
DATED : July 20, 2004  
INVENTOR(S) : Wloka et al.

Page 1 of 1

It is certified that error appears in the above-identified patent and that said Letters Patent is hereby corrected as shown below:

On the title page: Item (57)
    Abstract (57), line 2, replace "graphic" with --graphics--;
    Abstract (57), line 3, replace "graphic" with --graphics--.

Col. 14, line 50, replace "us" with --as--.

Signed and Sealed this  
Sixth Day of September, 2011

David J. Kappos  
*Director of the United States Patent and Trademark Office*